May 5, 1964 T. ROWLANDS 3,131,612
PRODUCTION OF MOUTHPIECES FOR CIGARETTES
Original Filed Nov. 22, 1960 10 Sheets-Sheet 6
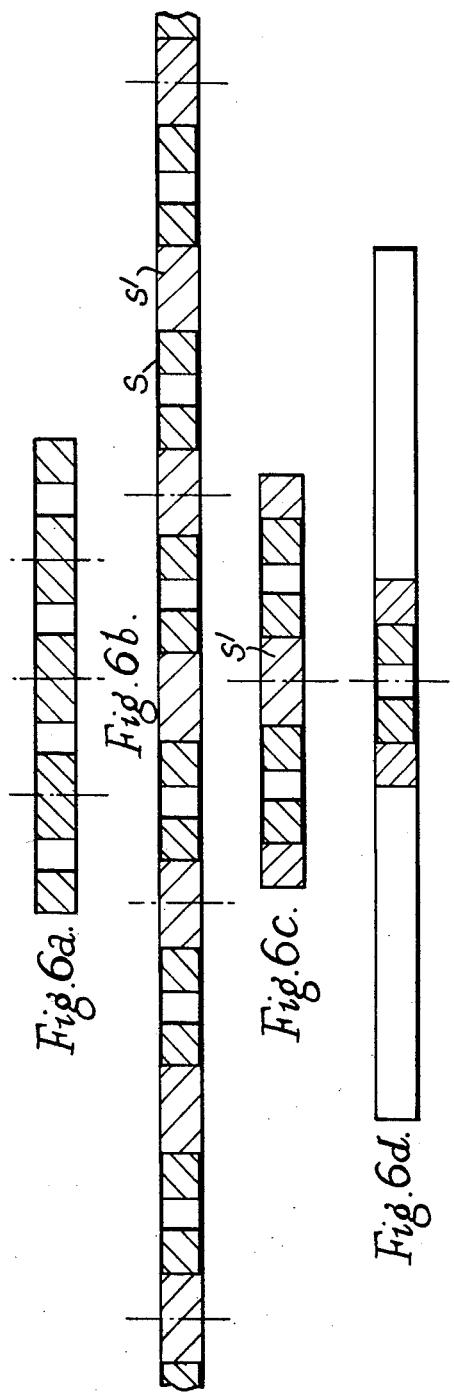
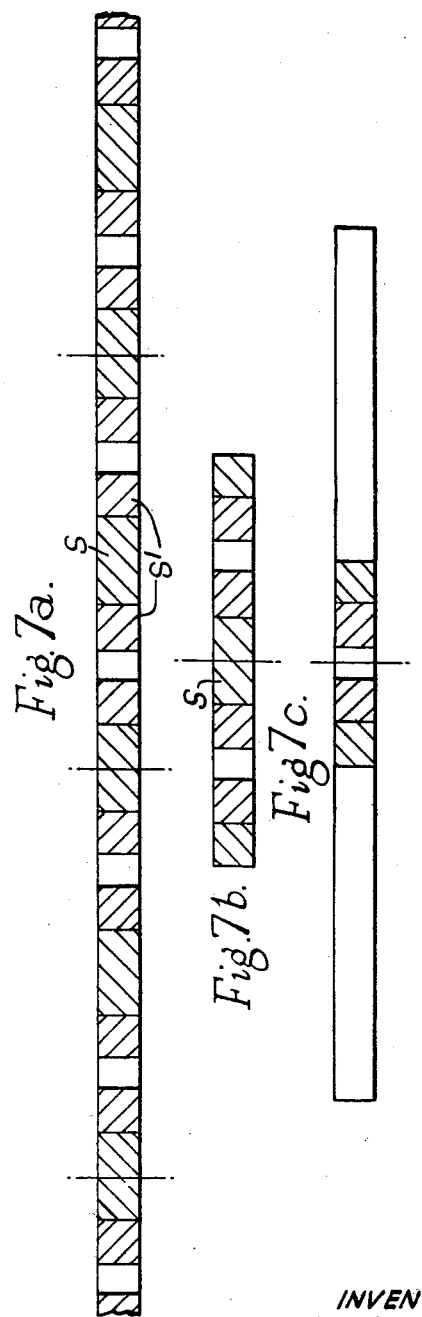
INVENTOR
Tom Rowlands
BY
ATTORNEYS May 5, 1964 T. ROWLANDS 3,131,612
PRODUCTION OF MOUTHPIECES FOR CIGARETTES
Original Filed Nov. 22, 1960 10 Sheets-Sheet 7
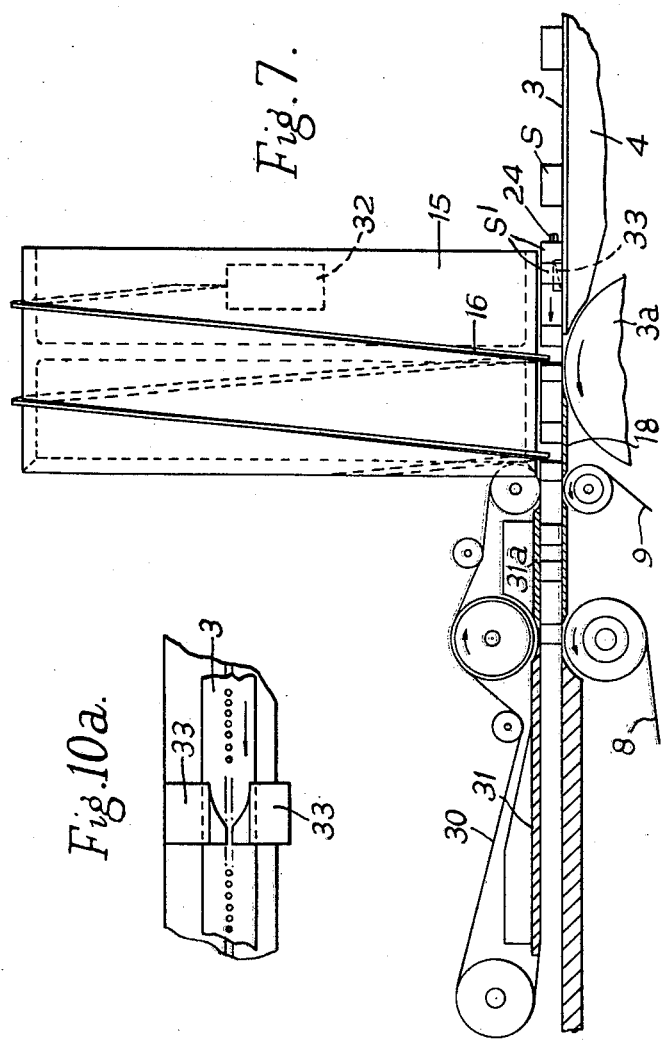
INVENTOR
Tom Rowlands
BY
Watson, Cole, Grindle & Watson
ATTORNEYS May 5, 1964 T. ROWLANDS 3,131,612
PRODUCTION OF MOUTHPIECES FOR CIGARETTES
Original Filed Nov. 22, 1960 10 Sheets-Sheet 8

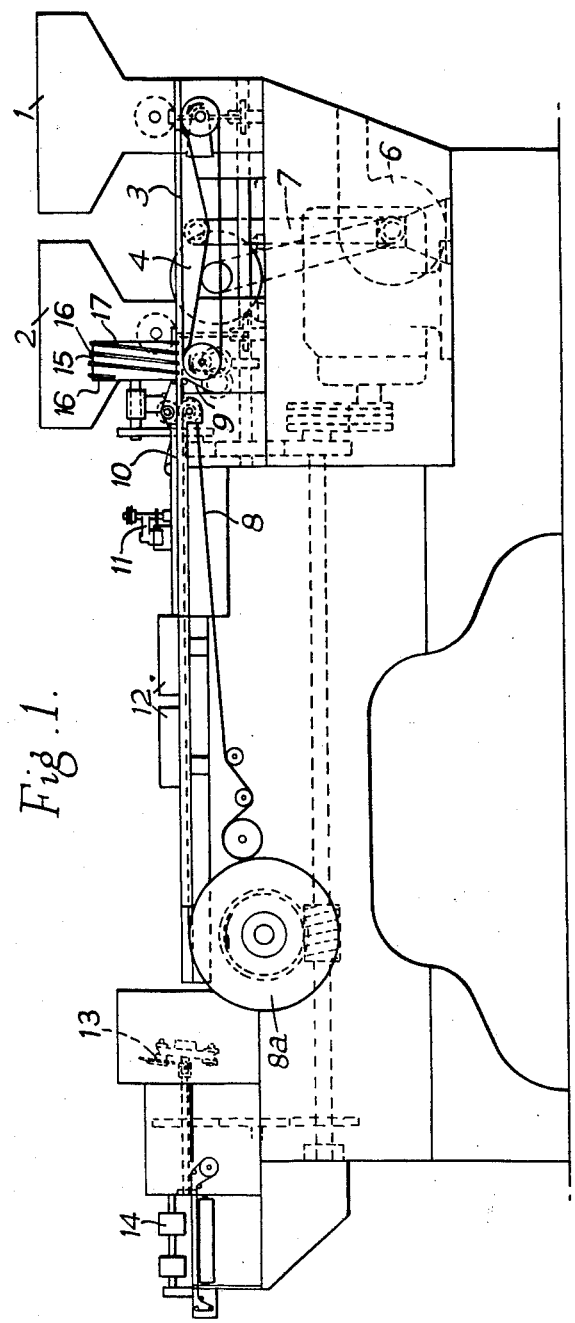

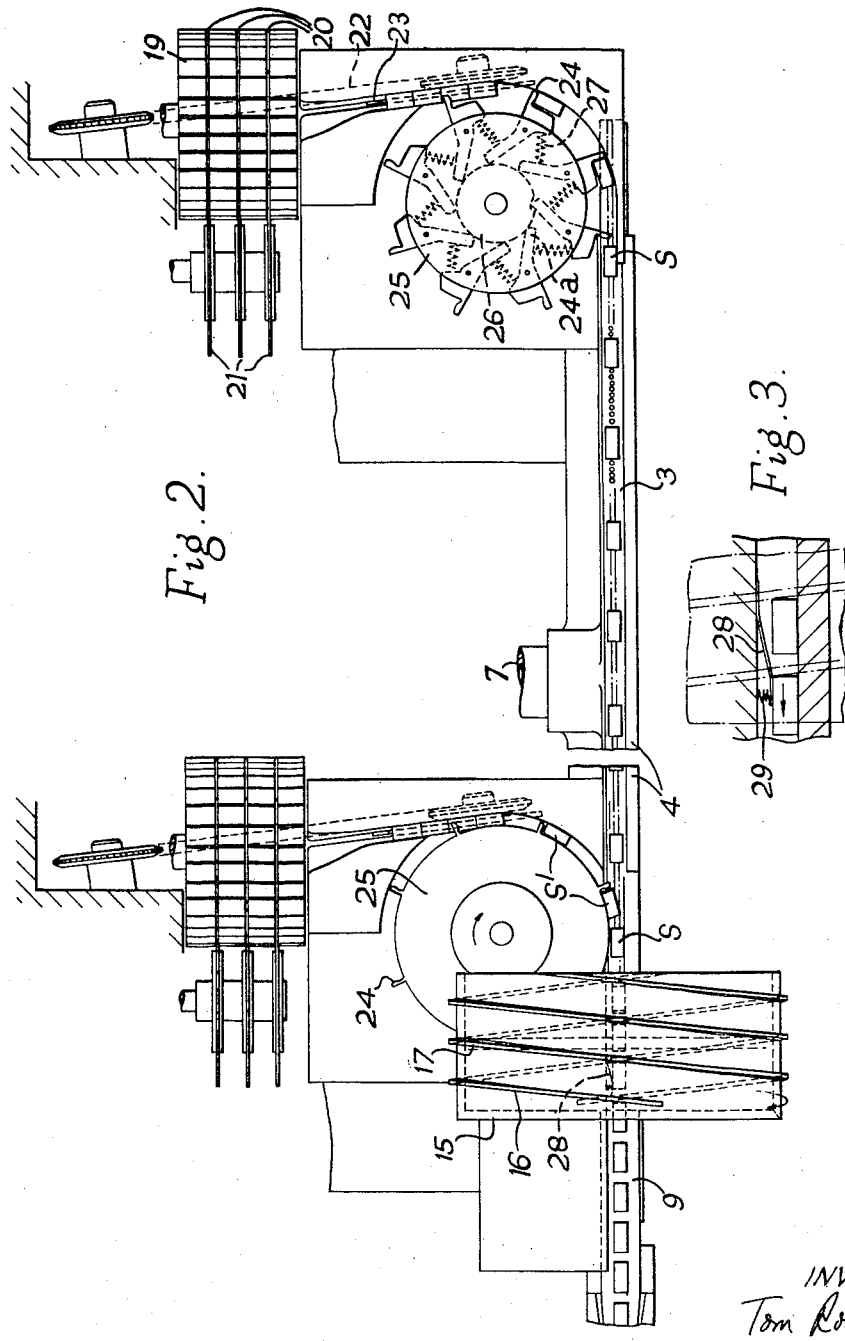

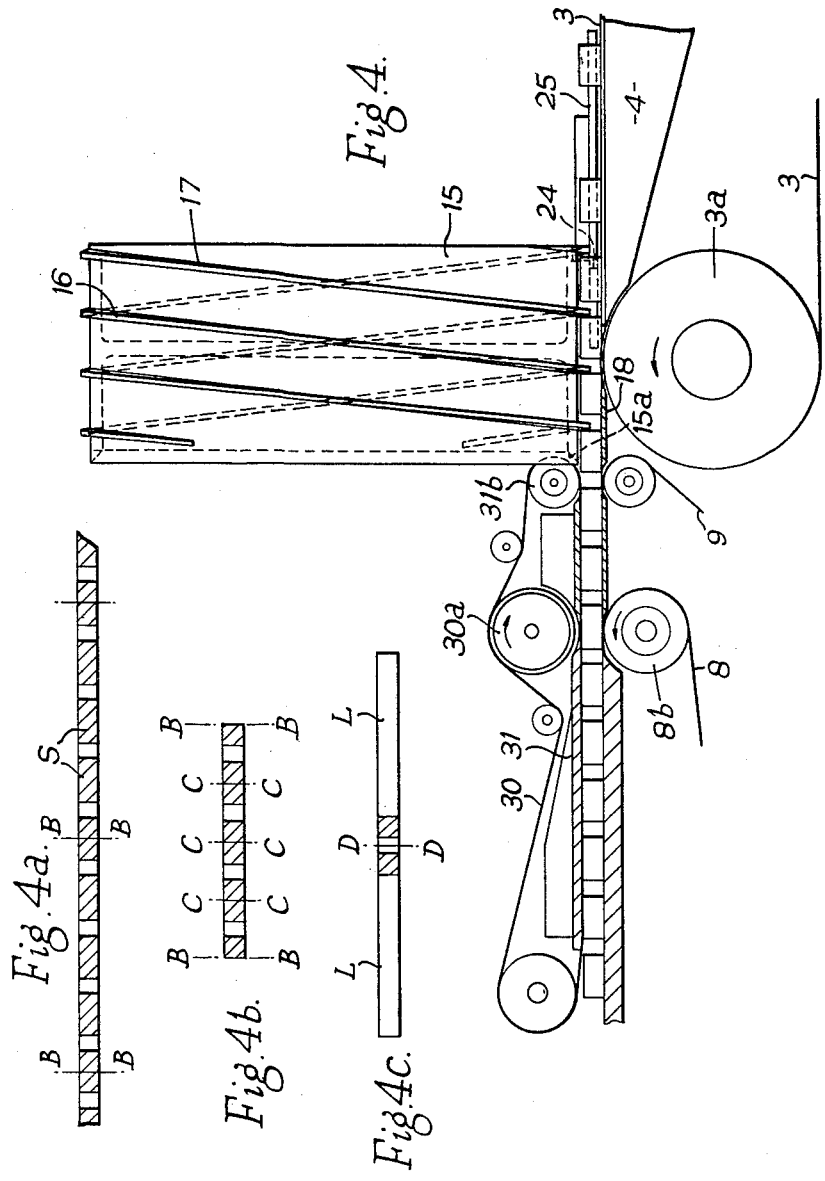

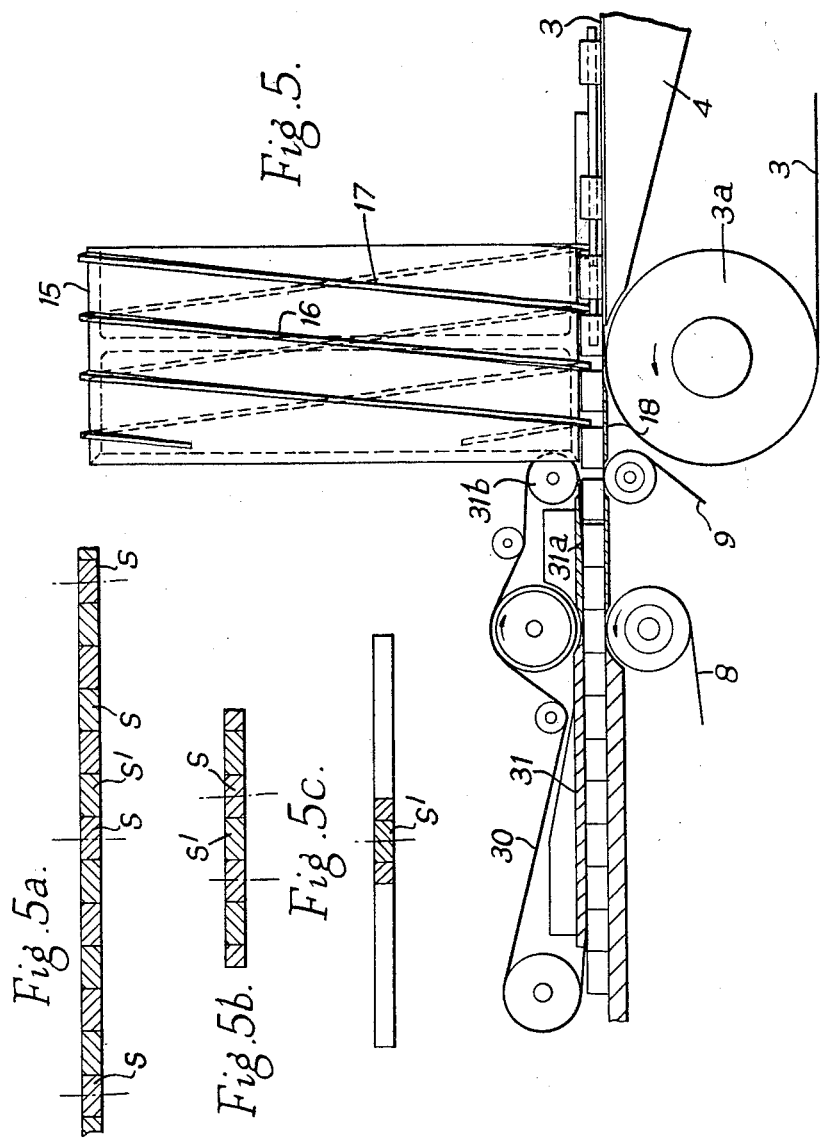

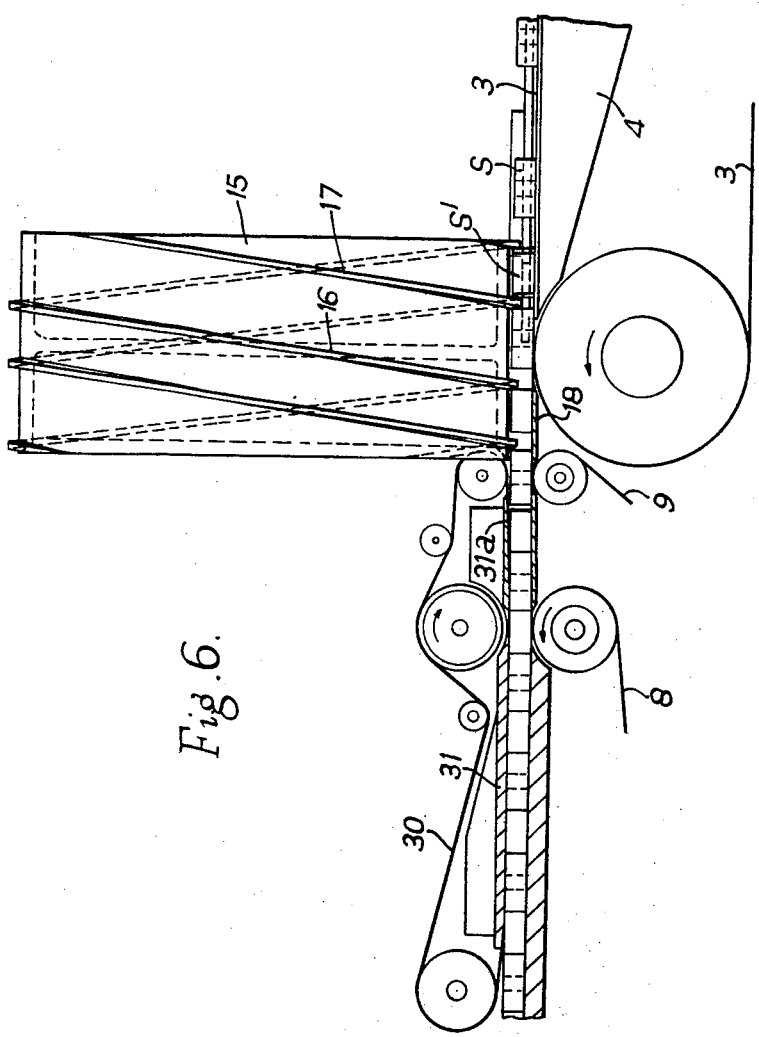

INVENTOR
Tom Rowlands
BY
Watson, Cole, Grindle & Watson
ATTORNEYS

May 5, 1964  T. ROWLANDS  3,131,612
PRODUCTION OF MOUTHPIECES FOR CIGARETTES
Original Filed Nov. 22, 1960  10 Sheets-Sheet 9

INVENTOR
Tom Rowlands
BY
Watson, Cole, Grindle & Watson
ATTORNEYS

May 5, 1964  T. ROWLANDS  3,131,612
PRODUCTION OF MOUTHPIECES FOR CIGARETTES
Original Filed Nov. 22, 1960  10 Sheets-Sheet 10
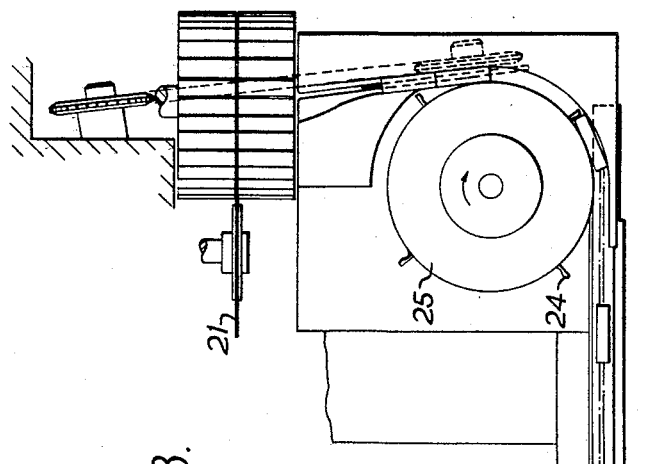
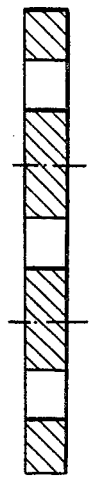
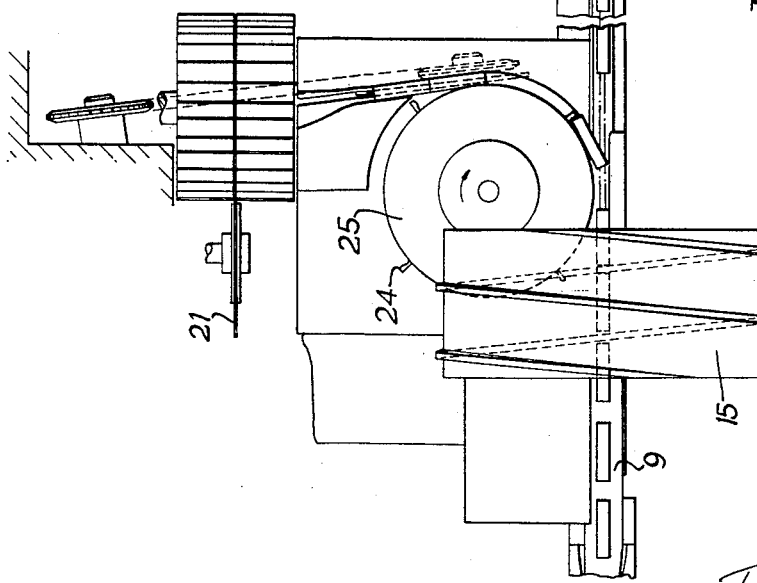
INVENTOR
Tom Rowlands
BY
ATTORNEYS

United States Patent Office 3,131,612
Patented May 5, 1964

3,131,612
PRODUCTION OF MOUTHPIECES FOR CIGARETTES
Tom Rowlands, Deptford, London, England, assignor to Molins Machine Company Limited, London, England, a British company
Original application Nov. 22, 1960, Ser. No. 71,091, now Patent No. 3,118,454, dated Jan. 21, 1964. Divided and this application Feb. 25, 1963, Ser. No. 260,564
Claims priority, application Great Britain Nov. 26, 1959
9 Claims. (Cl. 93—1)

This invention concerns improvements in or relating to the production of mouthpieces for cigarettes, and to the manufacture of composite mouthpiece rods for use in making mouthpiece cigarettes, and in particular, to the manufacture of such rods by forming a continuous composite mouthpiece rod and cutting it at intervals. The present application is a division of my copending application Serial No. 71,091 filed November 22, 1960, now Patent No. 3,118,454. Furthermore, the following description contains features disclosed and claimed in my copending application Serial No. 260,577, filed concurrently herewith. For convenience, a portion of mouthpiece rod of a length suitable for association with an individual cigarette will be referred to herein as a "mouthpiece portion," while the expression "composite mouthpiece rod" is to be understood as meaning a portion of mouthpiece rod whose length is a multiple of that of a mouthpiece portion, and which comprises different components arranged endwise in line (whether in endwise abutment, or separated endwise) and held together by an outer enclosing wrapper. Thus a portion of mouthpiece rod which is double the length of a mouthpiece portion, and which contains more than one component, is an example of a composite mouthpiece rod. Such a double-length rod may be introduced between and joined to two plain cigarette lengths and then cut in half so as to provide two mouthpiece cigarettes. A further example of a composite mouthpiece rod is a portion of rod whose length is a multiple of the length of a double-length rod so as to be conveniently divisible into double-length rods, for example during the process of making mouthpiece cigarettes.

The word "component" where used herein is to be understood as meaning any portion of material suitable for incorporation in a mouthpiece portion. For example a component may consist of a piece of filtering material. In some cases a component may itself be composite in structure and comprise a plurality of portions of material, either arranged together or spaced apart, and joined by an enclosing wrapper. Where the context permits, the word "component" includes a pair or a group of components, arranged end to end.

Mouthpieces for cigarettes may take many different forms, for example a mouthpiece may consist of a portion of material (e.g. filtering material) enclosed in a tube but with a hollow open space at one end of the tube, namely the end which is to be put in the smoker's mouth. Again, a mouthpiece portion may consist of two separate portions of material end to end, which may be of different character; for example one portion may be chosen for its filtering qualities, and may be located between the tobacco portion of the cigarette and another mouthpiece component chosen chiefly for its appearance. In that case also there may be a hollow open space at the extreme end of the mouthpiece. Further, in a composite mouthpiece portion such as has just been mentioned, the two separate components may be of different lengths.

In making mouthpiece cigarettes, it is usual to use multiple-length mouthpiece rods (whether composite or not) of a convenient length for handling, and to subdivide these into "double-length" rods, each of which is then inserted between, and joined to, two lengths of cigarette rod, the resulting assemblage then being severed through the double-length mouthpiece rod so as to produce two mouthpiece cigarettes. Accordingly the length of the mouthpiece portion required for a particular brand or type of cigarette determines the length of the double-length rod, and the multiple-length rods from which these are cut must have a length which is an exact multiple of a double-length rod. The multiple-length rods used for different mouthpiece lengths must, therefore, differ somewhat in size, but it is desirable (especially if they are all to be used in the same mouthpiece-cigarette-making machine) that they should not differ too greatly in size from one another. Accordingly these differences are kept as far as practicable within convenient limits by varying the number of double-length rods to be cut from the multiple-length rods. As an example, three 30 mm. double-length rods may be produced from a 90 mm. multiple-length rod, while four 23 mm. double-length rods may be produced from a 92 mm. multiple-length rod.

Where the rods are composite, i.e., comprising different components, it is necessary to cut the continuous composite rod not only at suitable intervals to produce the required overall lengths, but also at the correct positions to produce rods having the desired arrangement of components—that is, an arrangement lending itself to subsequent sub-division of the rod into double-length rods and finally the sub-division of these double-length rods into individual mouthpieces.

As has been mentioned above, mouthpieces for cigarettes may take many different forms, and when they are of a composite nature (e.g. comprising two different portions of material, or comprising one or more portions of material enclosed in a tube with a hollow open end) the composite rod from which composite mouthpieces of any particular style or arrangement are to be produced must be suitably constructed as to its overall length and the number, lengths and disposition of its various components. Since different manufacturers, or any one manufacturer, may wish to make mouthpiece cigarettes having various different mouthpiece arrangements, it is desirable that a machine for making composite mouthpiece rods should be readily adaptable to the production of a range of rods having various different arrangements and numbers of components, and of different overall lengths.

According to the present invention there is provided a machine for making composite mouthpiece rods, in which a continuous composite rod is formed by feeding components to, and enclosing them in, a continuous wrapper, the said machine comprising means to feed the wrapper continuously, means to feed components in a predetermined sequence to the wrapper, means operative in timed relationship to the component feeding means to cut the rod at intervals such that each severed length of rod contains a desired number of components, and means permitting alteration of the speed of the wrapper for a given rate of operation of the component feeding means to enable the latter to feed said desired number of components in a desired arrangement in the time required to feed a length of the wrapper equal to the total length of said desired number of components, in which said component feeding means includes a rotatable member provided with a screw thread with a leading face serving as a cam surface arranged to engage successive components and push them forwardly onto the wrapper, the member being rotatable about an axis substantially parallel to the direction of feed of the components immediately prior to engagement by the screw thread.

The machine may further include means to change the timed relationship between the feeding means and the cutting means so that the cutting means can sever lengths of the rod containing a different desired number of components. Thus the timed relationship between the cutting means and the feeding means can be changed in such manner that a different desired number of components is fed by the feeding means for each operation of the cutting means. For example the machine may comprise a common driving means to drive the cutting means and the feeding means, one of them being driven through interchangeable gearing whereby the speed ratio of the one to the other may be varied over a chosen range. For example three different ratios may be obtainable such that for each operation of the cutting means the feeding means will feed three, four or six components respectively.

By this arrangement the machine can, by relatively few and simple adjustments, be adapted to produce a very wide range of composite mouthpiece rods differing considerably in composition and in the number, size and spacing of the components they contain. By changing the speed ratio of the cutting means to the feeding means it is possible to feed more or fewer components per cutting operation, according to the size and spacing of the components in any particular pattern or arrangement required, and thus preserve a reasonable approach to uniformity in the overall lengths of the differently constituted rods produced, or at any rate avoid unduly great differences in their lengths.

More than one screw thread may be provided on the rotatable member the threads being equally spaced around the circumference of the rotatable member, whereby more than one component can be fed for each revolution of the rotatable member. Where more than one thread is provided the threads may be arranged to have unequal spaces between them so that components of different lengths can be accommodated in adjacent spaces between different threads.

The rotatable member may be interchangeable with another such member on which the threads have a different spacing so that a component of a different length may be accommodated between the threads, and preferably a range of interchangeable members having different thread arrangements is provided in order to enable the user of the machine to change over from the production of mouthpiece rods of one character to rods of another character, that is, containing components of a different length or lengths.

Where reference is made herein to a component being accommodated between screw threads or being fed by a thread, it is to be understood that the term "a component" includes, where the context permits, a group of end-to-end components (e.g. a pair, or one long and two short components). The machine may comprise an endless moving surface opposed to the surface of said wrapper so that the two said surfaces can grip articles between them, the said rotatable member being arranged to push a component into the grip of the said wrapper surface and the said endless surface, and being recessed at its delivery end to accommodate at least a guide member (e.g. a roller) about which the said endless surface passes, so that the latter can extend far enough rearwardly (considered in the direction of feed of the articles) to be able to engage a component while the latter is still being pushed forwardly by the said cam surface.

This arrangement provides a very convenient and simple arrangement whereby a mouthpiece component can be accurately positioned and continuously fed forward in a positive way without having an opportunity of losing its accurate positioning and timing. Where mouthpiece components are being fed on to a continuous wrapper which is folded about them to form a continuous composite rod, this arrangement eliminates the difficulty and complication which would arise if the components were pushed on to the wrapper by pushers mounted on, for example, an endless chain, since such pushers would have to be retracted in some way to avoid fouling either the wrapper (which will normally be starting to assume U cross-section at the position where it receives a component) or the roller or other guide member about which the opposed gripping surface passes. The said rotatable member may be further provided with a presser-surface so located as to engage at least the rear one of two endwise abutted, forwardly moving components and to press the said rear component against a counter-surface so as to arrest or retard its forward movement until a screw thread has entered between the two components so as to ensure their separation. The counter-surface may be formed by a bridge piece over a conveyor which feeds the components towards the rotating member.

Such an arrangement may be used where for example it is required to produce mouthpiece portions each comprising two separate components end to end, with a hollow space at the extreme end of the mouthpiece portion. For this purpose, pairs of relatively short, endwise abutted components (e.g. of one character) may be fed in alternation with single components (e.g. of another character) each of which may be equal in length to a pair of the shorter components. The presser-surface on the rotatable member engages at least the rear one of each such pair of short components, so that the said rear component is gripped and retarded, thereby enabling the pair to be separated by the screw thread, which feeds the leading one of the separated pair into abutment with the single component which precedes it, and which is itself abutted against the rear one of the preceding pair of short components; thus groups of components are formed, each consisting of a single (e.g. a long) component lying between two short components, and the groups are spaced apart by the thread on the rotatable member. Thus when these groups are fed on to a continuous wrapper in this formation, a continuous rod can be formed which can be so subdivided, by stages, as to produce a double-length mouthpiece portion in the form of a composite rod consisting of two pairs of abutted components separated by a hollow space.

It will be appreciated that very short mouthpiece components are often difficult to feed accurately and the arrangement just referred to provides a useful means of achieving this, since initially the short components (which may for example be of a length such as is required for one component of an individual composite mouthpiece portion) can be fed as a pair end to end.

In any of the arrangements mentioned above in which a double-length mouthpiece rod contains three end-to-end components, the central component may contain tobacco, at least at its mid-portion (i.e. where the double-length mouthpiece will be cut to produce two individual mouthpieces) so as to produce mouthpiece cigarettes having tobacco at both ends as mentioned above.

Apparatus in accordance with the invention will now be described by way of example with reference to the accompanying drawings in which:

FIGURE 1 is a side elevation of a machine for making composite mouthpiece rods,

FIGURE 2 is a plan of part of the machine shown in FIGURE 1,

FIGURE 3 shows a detail of FIGURE 2, to an enlarged scale,

Figure 8:
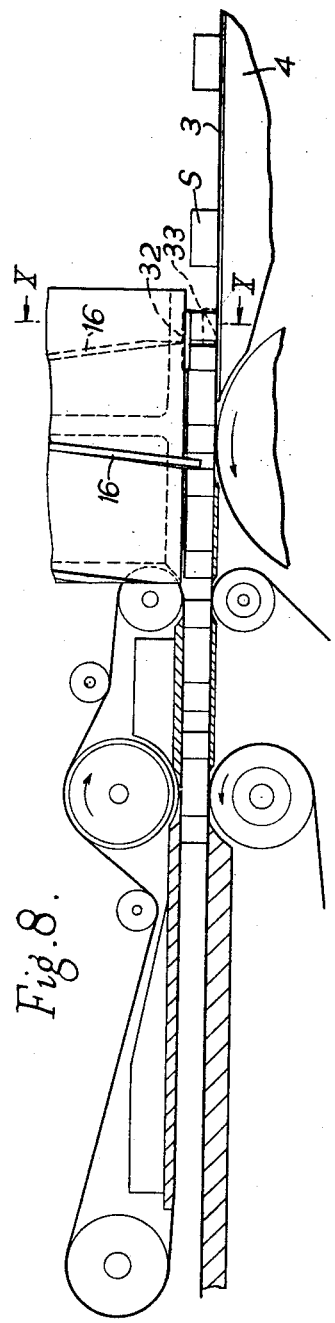
Figure 9:
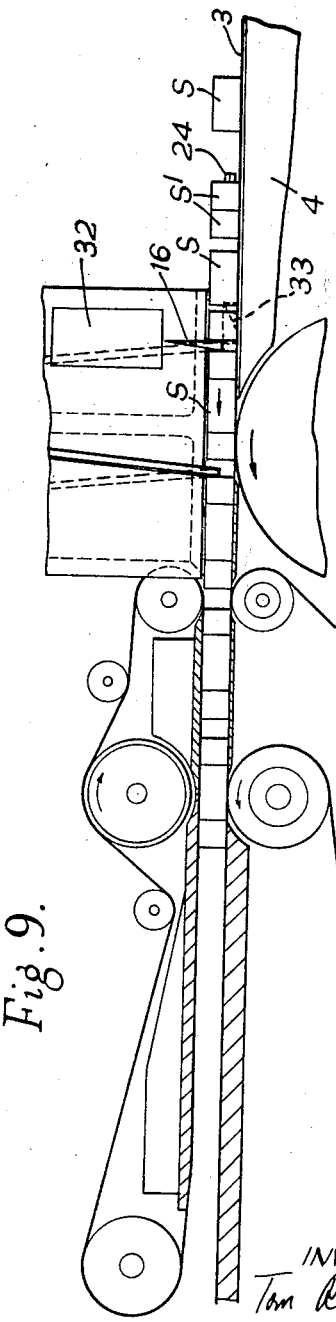

FIGURE 4 is an elevation, to an enlarged scale, of part of the apparatus shown in FIGURES 1 and 2, FIGURES 4a, 4b, and 4c diagrammatically illustrate the product of the arrangement illustrated in FIGURE 4, FIGURE 5 is a view similar to FIGURE 4, but showing a modified arrangement, FIGURES 5a, 5b, and 5c diagrammatically illustrate the product of the arrangement illustrated in FIGURE 5, FIGURE 6 is a view similar to FIGURES 4 and 5, but showing a further modified arrangement, FIGURES 6a, 6b, 6c and 6d diagrammatically illustrate the product of the arrangement illustrated in FIGURE 6, FIGURES 7, 8 and 9 are views similar to FIGURES 4, 5 and 6 but showing a still further modified arrangement, FIGURES 7a, 7b and 7c diagrammatically illustrate the product of the arrangement shown in FIGURES 7, 8 and 9.

Figure 10:
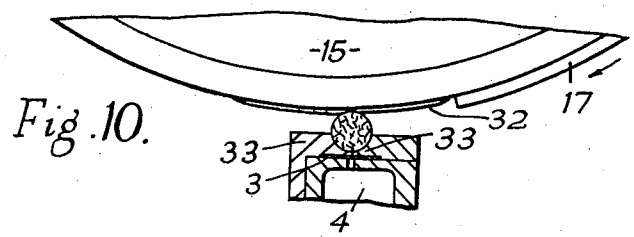
Figure 11:
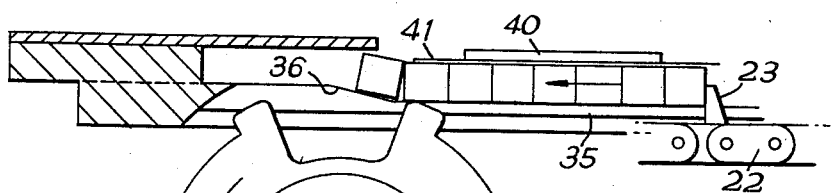
Figure 12:
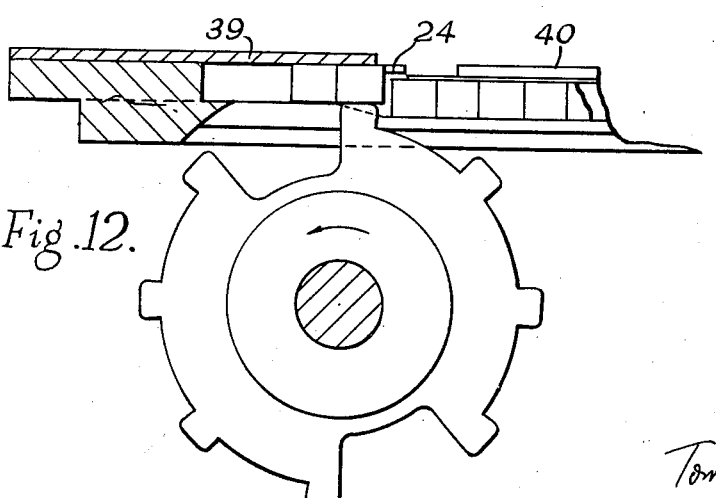

FIGURE 10 is a section on the line X—X, FIGURE 8,

FIGURE 10a is a plan of part of FIGURE 10,

FIGURES 11 and 12 show arrangements for feeding short stubs in pairs, and

FIGURE 13 is part of a plan of the machine shown in FIGURE 1, having a different arrangement to that shown in FIGURE 2, and FIGURE 14 diagrammatically illustrates a further example of a composite mouthpiece rod.

Referring to FIGURES 1 and 2, the machine includes two hoppers 1 and 2 for mouthpiece components (which for the sake of brevity will hereinafter be referred to generally as "stubs"), a perforated conveyor 3 through which air is drawn into a suction chamber 4 by a fan 6 connected to the suction chamber by a duct 7, and a conveyor tape 8 carrying a web 9 of stiff paper. The conveyor tape 8 is driven by a pulley 8a, FIGURE 1, which is adjustable so as to vary its diameter and thereby vary the speed of the tape 8. The pulley 8a may be constructed and arranged in the manner disclosed in United States patent specification No. 2,180,481. Folding, gumming and sealing devices, diagrammatically shown at 10, 11 and 12 respectively in FIGURE 1, act to fold and secure the stiff paper 9 about stubs which have been deposited thereon, to form a continuous composite mouthpiece rod. This rod is severed at suitable intervals by cut-off mechanism 13, FIGURE 1, and the cut lengths or rods are deflected sideways by deflector mechanism 14.

Located above the delivery end of the suction conveyor 3 is a screw-threaded rotatable element 15, to be referred to hereinafter for brevity as a worm, whose screw thread constitute feeding means for the stubs being fed to the paper 9. As better seen in FIGURE 2, the worm has a double or "two-start" thread, or in other words has two threads 16 and 17. A short bridge 18, best seen in for example FIGURE 4, bridges the gap between the suction conveyor 3 and the paper 9, and provides a stationary surface over which stubs are pushed endwise by the worm 15, as will be explained later.

Each of the hoppers 1 and 2 comprises a fluted drum 19 having peripheral grooves 20 to accommodate disc knives 21. As shown in FIGURE 2 the grooves and knives are three in number, but this number may be varied according to requirements. Multiple length stubs are fed in flutes of the drum 19 and subdivided into four by the knives 21. The subdivided stubs are fed out of the flutes by a conveyor 22 having pushers 23, which pass obliquely through successive flutes so as to form a line of endwise-moving stubs. The foremost stub of the line is pushed up out of line so as to expose its rear face for engagement by a pusher 24 carried by a disc 25. The pusher 24 accelerates the stub and pushes it on to the suction conveyor 3.

The arrangements just described for feeding stubs from the hopper are generally similar to those disclosed in United States patent specification No. 3,009,557, filed February 10, 1958.

The disc 25 and pushers 24 shown at the right-hand side of FIGURE 2 differ from those shown at the left-hand side in that in the latter case the pushers are integral with the disc, while in the former case the pushers are pivoted on the disc and have tail pieces 24a which are urged into engagement with a fixed cam 26 by springs 27. The cam has a recessed portion into which the tail piece of each successive pusher moves so that the pusher swings rearwardly away from the stub it has been pushing. This arrangement ensures that the pushers will disengage the stubs when the latter are on the suction conveyor, without rubbing across their rear faces. This arrangement could if desired be used for both stub feeds, or alternatively the plain disc with integral pushers illustrated at the left-hand side of FIGURE 2 could be used for both feeds, since in practice this arrangement is found satisfactory and is simpler than the other.

The two stub-feeding devices associated with the hoppers 1 and 2 are arranged respectively to feed stubs S, S' on to the suction conveyor 3 at spaced intervals such that they alternate with each other, and are somewhat spaced apart, as they approach the worm 15. The spacing of the threads 16, 17 is such that a stub can be accommodated between each pair of threads, and the timing and speed of rotation of the worm are such that a thread enters the space after each successive stub and thereafter feeds that stub forwardly at a speed which may be approximately the same, or slightly less than the speed of the suction conveyor 3. The body portion of the worm is suitably spaced from the conveyor 3 and bridge 18 to provide sufficient clearance for stubs to move along beneath it freely. As best seen in, for example, FIGURE 4, the suction chamber ends at a position a short distance along the length of the worm, and beyond that position a stub is free from suction and can easily slip on the perforated conveyor 3. The latter passes around a wheel 3a, and beyond that the stubs are supported on the stationary bridge 18. Since the forward movement of a stub over the bridge 18 is effected entirely by the thread 16 or 17 engaging its rear face, it will be seen that the worm controls the feed of the stubs at that position and regulates their spacing and their longitudinal position.

A finger 28, FIGURES 2 and 3, is arranged below the level of the threads 16 and 17 and is urged by a spring 29 towards the stubs so as to press lightly against their sides and frictionally retard them. This is in order to ensure that each stub is properly located with its rear face in contact with the thread immediately behind it.

Referring now particularly to FIGURES 2, 4 and 4a to 4c, the arrangement illustrated in these figures is one in which a composite continuous rod is to be formed consisting of spaced stubs with hollow spaces between them. For this purpose the speed of the conveyor 8 carrying the paper web 9 is equal to the forward speed at which the stubs are fed by the worm 15. As stated above, the pulley 88a which drives the conveyor tape 8 is adjustable so that its diameter can be made greater or smaller in order to vary the speed of the tape 8. This adjustment covers a small range of speeds, and in order to enable the speed of the tape 8 to be adjusted over a wide range, a number of pulleys (e.g. three) of different diameters are provided, each being adjustable so that for any desired speed of the tape a suitable pulley is fitted and adjusted to the required diameter. An endless belt 30 running beneath a shoe 31 at the same speed as the conveyor 8 controls the positioning of the stubs, which are gripped between the web 9 and belt 30, and maintains the spacing given to them by the worm 15 until they have entered the folding mechanism 10, FIGURE 1, and the web 9 is partly folded about them. The belt 30 reverses about a roller 31b which partly extends into a recess 15a in the front face of the worm 15. This enables the roller 31b to be set back far enough for a stub to be gripped between the web 9 and belt 30 while it is still being positively pushed forward and located, by a thread 16 or 17. The belt 30 is driven by a drive roller 30a which in turn is driven by suitable gearing from a roller 8b about which the conveyor tape 8 passes, and which is driven by the tape 8. Thus the speed of the belt 30 is always the same as that of the conveyor tape 8.

The driving means for the conveyor 3, the pulley 8a, the cut-off 13 and the worm 15 are illustrated in FIGURE 1. These are all driven from a motor M through a main drive shaft D, which carries a worm 101 engaging a wormwheel 102 on the pulley 8a; a gear 103 driving the cut-off 13 through gears 104 and 105 and shaft 106; and a gear 107 driving the worm 15 through gears 108, 109 and belt and pulley drive 110 to the shaft 111 of the worm. The gear 108 drives a shaft 112 which carries a gear 113 which drives the pulley 3a through a train of gears as shown.

The continuous rod thus formed is diagrammatically illustrated in FIGURE 4a, where the lines B—B show the positions at which the continuous rod is cut by the cut-off mechanism 13 to produce rods as shown in FIGURE 4b.

The rod shown in FIGURE 4b is divisible into four rods each double the length of a final mouthpiece portion, by cutting along the lines C—C to produce rods as shown in FIGURE 4c. Each of the cuts so far made have been made midway along the length of a stub, so that the double-length mouthpiece portion shown in FIGURE 4c comprises two short stub lengths with a hollow space between it. This double-length mouthpiece portion is inserted between two cigarette lengths L, as shown in FIGURE 4c, and united to them by a band (not shown) encircling the mouthpiece portion and the inner end portions of the cigarette lengths, and the resulting assemblage is cut through the hollow portion as shown by the line D—D, FIGURE 4c, to produce two mouthpiece cigarettes each having a hollow-ended, or recessed, mouthpiece.

It will be seen that in order to produce rods as shown in FIGURE 4b, four components must be fed for each operation of the cut-off. As the worm 15 has two threads 16 and 17 which are 180° out of phase and each of which feeds a stub, two stubs are fed to the paper web on each revolution of the worm. Accordingly in this arrangement the worm rotates through two revolutions for each operation of the cut-off. The worm and the cut-off are both driven from the same main drive D, driven from a motor M, the ratio of the main drive to the worm being 1:2 and of the drive to the cut-off being 1:1 as diagrammatically indicated in FIGURE 1. It is convenient to maintain this 1:2 ratio of the main drive to the worm in all cases, and to change the ratio of the main drive to the cut-off (by the use of suitable change gears) as may be required in order to cause a different number of components to be fed for each operation of the cut-off. Examples of such cases will be referred to later.

As stated above, in the example described with reference to FIGURES 4 and 4a to 4c, the speed of the paper web 9 is equal to the speed at which the stubs are fed by the worm 15. Thus the spacing between the stubs on the paper web is the same as the spacing at which they are fed by the worm, which depends on the pitch of the threads 16 and 17. If it were desired to reduce or increase the spacing between the stubs on the paper web (for the same thread pitch and the same length stubs), it would be necessary to reduce or increase, respectively, the speed of the web 9 (and likewise that of the conveyor 8 and belt 30). In all cases, of course, the cut-off must be suitably timed so that it will always cut substantially midway through the length of a stub.

In the arrangement just described with reference to FIGURES 2, 4 and 4a to 4c, the stubs fed from the two hoppers 1 and 2 are of the same character in order that cigarettes with identical mouthpieces may be produced from the composite mouthpiece rods formed. The subdivisions of the multiple-length rods shown in FIGURE 4b will usually be effected during the manufacture of the mouthpiece cigarettes, since rods such as that shown in FIGURE 4b are of a convenient size to handle and to feed from a hopper.

FIGURE 7 shows a further arrangement and is intended for use in feeding relatively long stubs. The arrangement is basically similar to that of FIGURE 2, the only essential differences being that the sub-feeding discs 25 are provided with only four pushers 24 instead of eight as in the earlier case, and the worm 115 has only a single thread instead of two as in FIGURE 2.

In the arrangement illustrated in FIGURE 13 each stub fed from each hopper is 34 mm. long, and these stubs are fed by the worm on to the stiff paper web 9 whose speed is so regulated relatively to the worm and other feeding devices that a space of 6 mm. is left between the opposed ends of successive stubs.

The gear ratio of the main drive to the worm is maintained at 1:2 in the present case, and that of the main drive to the cut-off is 1:1. Accordingly the cut-off mechanism operates to cut the composite continuous rod once for every two revolutions of the worm. In this case, as the worm has only a single thread, one stub is fed on to the paper web for each revolution of the worm, and thus two stubs are fed for each operation of the cut-off. As stated above, the paper speed is regulated to ensure a 6 mm. gap between successive stubs, and accordingly the cut-off (being timed to cut the continuous rod midway along the length of a stub) divides the continuous rod into rods each of which is 80 mm. long and contains one central 34 mm. stub with two 17 mm. stubs at its ends, these being separated from the central stub by 6 mm. gaps. Each such rod is intended to be cut in half to produce two double-length rods each of which is to be joined to a pair of cigarette lengths and subdivided in the manner described in the above-mentioned specification.

Since in the arrangement just described, the worm has only one thread and delivers only a single stub per revolution, it is desirable (in order to maintain the normal speed of operation of the discs 25 and conveyor 3) to halve the number of pushers 24. Each of the stub hoppers is provided with only a single knife 21 to produce stubs of the required size.

The arrangement shown in FIGURES 5 and 5a to 5c is one in which a composite mouthpiece rod is made which comprises components of different character, abutted end to end. For this purpose the hoppers 1 and 2 respectively contain stubs of different nature—for example one may contain stubs of material chosen for its filtering qualities while the other contains stubs chosen chiefly for appearance. The stubs coming from the two different hoppers are fed in alternation to the worm 15, which continues their forward feed in alternation while controlling their longitudinal positioning.

As in this case it is required to abut the stubs endwise in the rod, the speed of the conveyor 8 and belt 30 is made a little less than that of the stubs fed by the worm, to cause the stubs to close up endwise on reaching the paper 9. To allow a certain freedom of movement to the stubs during this closing up process, a part 31a of the shoe 31 is raised a little as shown in FIGURE 5. This part 31a is mounted on a pivoted member on which is also mounted a guide roller 31b for the belt 30, so that the part 31a and the part of the belt running over it can readily be adjusted to either the position shown in FIGURE 5 or that shown in FIGURE 4. Thus it is a relatively simple matter to adjust the apparatus so as to produce either the rod shown in FIGURE 4a or that shown in FIGURE 5a.

The continuous rod produced is illustrated in FIGURE 5a. Stubs S which may be of primarily filtering material alternate with stubs S' which may be of a kind chosen for their appearance. The continuous rod is subdivided by cutting through stubs S to produce rods as shown in FIGURE 5b, and these are again subdivided (usually during the manufacture of mouthpiece cigarettes) by cutting through stubs S as shown in FIGURE 5b, to produce double-length mouthpiece portions or rods, as shown in FIGURE 5c. It will be seen from this latter figure (in which the double-length rod is shown between two cigarette lengths to which it will be joined) that the final cut is made through a stub S', so that the finished mouthpiece comprises two abutted short components, the one at the extreme end of the mouthpiece cigarette being formed from a stub S'—namely the stub chosen for its appearance.

The paper web 9 used for wrapping the components to produce the rods shown in FIGURES 5a and 5b can be of ordinary cigarette-paper instead of stiff paper, since no hollow-ended mouthpiece is to be made.

It will be seen from FIGURE 5a that in order to cut the continuous rod to produce rods such as shown in FIGURE 5b, it is necessary to feed six stubs to the paper web for each operation of the cut-off mechanism. To effect this, the gear ratio of the main drive to the cut-off is changed to 1½:1, while the worm 15 continues to be driven at the same speed as mentioned previously. In other words, the gear ratio of the cut-off to the drive becomes 2:3, and the gear ratio of the cut-off to the worm thus becomes 1:3. Since the worm feeds two stubs per revolution, the cut-off effects one cut for every six stubs fed by the worm.

FIGURE 6 illustrates an arrangement in which components of different length can be used—that is, components of a certain length alternating with components of greater length. For this purpose the spacing of the threads 216 and 217 on the worm 215 is so arranged that any part of the thread 216 lying between two turns of the thread 217 is closer to one of those turns than to the other. Thus as seen in FIGURE 6, the spaces between the successive stub-engaging parts of the threads are alternately shorter and longer.

The hoppers 1 and 2 contain respectively longer and shorter stubs, which are fed in alternation and in suitable timed relationship with the worm so as each to be accommodated in an appropriate space between threads of the worm.

In this arrangement (as also in FIGURE 5) the stubs are closed up endwise on the paper web 9.

In the specific arrangement shown, the longer stubs are themselves of a composite nature, consisting of two short stubs enclosed in a stiff paper tube and with a hollow space between them. They may be made by apparatus such as described above with reference to FIGURES 4 and 4a–4c, and are produced from lengths of rod such as that shown in FIGURE 6a. The resulting continuous composite rod is illustrated in FIGURE 6b. The composite components, indicated by the reference S, alternate with shorter stubs or components S', and the continuous rod is subdivided by cutting through stubs S' at the positions indicated in FIGURE 6b, so as to produce rods such as that shown in FIGURE 6c. These latter rods are themselves subdivided, preferably during the manufacture of mouthpiece cigarettes, by cutting them into two as shown in FIGURE 6c, to produce two double-length mouthpiece portions or rods as shown in FIGURE 6d, where a double-length portion is shown between two cigarette lengths, and is to be severed through the hollow portion, so as to provide two mouthpiece cigarettes. Each of these cigarettes has a composite mouthpiece consisting of two short, end to end components, with a hollow open tube or recess at the end.

The stubs S' (the subdivided halves of which will lie between the tobacco portions of the cigarettes and the subdivided halves of stubs S) may be made of a material chosen for its filtering properties, while the stubs used for producing the composite stubs S may be of material chosen chiefly for its appearance.

The arrangement just described with reference to FIGURE 6 can, of course, be used with plain stubs instead of with composite stubs such as the stubs S illustrated in FIGURES 6 and 6b.

In order to produce rods comprising components of unequal length as just described, a suitable worm such as that shown in FIGURE 6 is employed, and suitable adjustment is made to the speed of the tape 8, web 9 and belt 30, relatively to the rotational speed of the worm, according to the lengths of the stubs or components to be delivered, such as to cause the latter to close up endwise on the paper web.

In this arrangement, as in the arrangement described with reference to FIGURES 5 and 5a to 5c, the web 9 may be of ordinary cigarette-paper, since the tubular portions are preformed with stiff paper during the manufacture of the composite stubs S.

It will be seen that in order to produce rods as shown in FIGURE 6c, four components (i.e. two stubs S' in alternation with two composite stubs S) must be fed to the paper web for each operation of the cut-off 13. Accordingly, as in the example described above with reference to FIGURES 4 and 4a to 4c, the gear ratio of the main drive to the cut-off is 1:1, that of the main drive to the worm 15 being maintained at 1:2.

FIGURES 7 to 10a, and 7a to 7c, illustrate a further arrangement by which it is possible to make composite rod from which mouthpieces each comprising two abutted components and a hollow open-ended tube can be produced.

In this arrangement, the hopper 1 (FIGURE 1) feeds single stubs S, FIGURE 7, while the hopper 2 feeds pairs of stubs S', each of the stubs S' being half the length of a stub S. These short stubs S' are fed in end-to-end abutment as pairs by the pushers 24 just as if each pair were a single stub. Thus apart from a small modification which will shortly be described with reference to FIGURE 11, the stub-feeding arrangements for feeding stubs on to the suction conveyor 3 can be the same as for the arrangements previously described.

The pitch of the thread 316 on the worm 315 is in this case sufficient to enable one long and two short components to be accommodated in each space.

Close to the rear end of the worm (considered in the direction of feed) is a presser-surface formed by a slightly outstanding portion 32 of the cylindrical surface of the worm. This is shown in FIGURE 10 with its thickness, or amount of radial projection from the worm, somewhat exaggerated for the sake of clearness. The width of the surface 32 (that is, its extent axially of the worm) is about equal to the length of two of the short stubs S', and the worm is timed so that the surface 32 engages each pair of stubs S' and presses downwardly against their cylindrical surfaces.

A short bridge 33 (FIGURES 10 and 10a) extends over the suction conveyor 3 at a position such that it is directly opposite the rear half of the surface 32 (considered in the direction of movement of the conveyor 3) whenever the surface 32 passes over the conveyor. The bridge 33 consists of two parts but can be considered as a single entity with a groove down the centre, the purpose of the groove being to eliminate the possibility of a sharp edge tearing a stub at that place where the stub is suctionally held to the conveyor 3. The shape of the bridge is such that a stub moving in a forward direction is gradually lifted from contact with the suction conveyor 3 until it is lightly held between the surface 32 and the bridge 33. Each successive pair of stubs S' is carried along by the pushers 24 which move from contact with the rear face of the rear stub of the pair S' just before the leading face of the leading stub of the pair S' comes into contact with the bridge 33. The leading stub of the pair is then pushed over and past the bridge by the rear stub which is suctionally held by the conveyor 3. The rear stub, however, is momentarily arrested on the bridge by the surface 32, which comes into engagement with both stubs at the moment when the leading stub has passed over the bridge but while the rear stub is still supported on the bridge. Thus the surface 32 presses the leading stub against the suction conveyor so that it is suctionally gripped and carried along, but presses the rear stub against the bridge so that it is momentarily gripped and arrested in its forward movement.

By the time the surface 32 has moved away from the rear stub, the leading stub has travelled a sufficient distance to create a gap between the two stubs, the gap being wide enough to allow the start of the thread 316, FIGURE 9, to enter between the two stubs.

In the meantime, a long stub S behind the pair of stubs S' has travelled forwardly substantially or almost into abutment with the rear stub S', and by its continued forward movement this stub S pushes the rear stub S' over the bridge and against the rear face of the thread 316.

The rotational speed of the worm is such that the rear face of the thread allows the stubs to travel forwardly a little slower than the conveyor 3, so that the next pair S' of short stubs, FIGURE 9, is fed into abutment with the stub S. In due course the presser-surface 32 comes into engagement with this further pair S' of short stubs, and the cycle described above is repeated. The leading stub of this pair is thus abutted against the rear end of the long stub S and becomes the rearmost component of a group between two turns of the thread 316 the leading component of this group being the short stub which was the rear one of the preceding pair of stubs S'. Each such group is spaced from the preceding and following group by a turn of the thread 316, and their spacing and also their longitudinal positioning controlled by the worm 15 while they are being fed by the worm.

The conveyor 8, web 9 and belt 30 travel at the same speed as that at which the groups of stubs are fed forwardly by the worm, and the part 31a of the shoe 31 is lowered so that the groups of stubs are immediately gripped between the web 9 and belt 30 as they are transferred from the worm, and thus their spacing is accurately maintained. A spring finger 28 as shown in FIGURES 2 and 3 may also be provided to ensure that the stubs forming a group are abutted and pressed back against the thread which feeds them on to the web 9.

The resulting continuous composite mouthpiece rod consisting of groups of stubs with hollow spaces between them is illustrated in FIGURE 7a. This rod is subdivided by cutting through stubs S, to produce rods as shown in FIGURE 7b. These rods are subdivided, preferably during manufacture of mouthpiece cigarettes, by cutting through the stub S, to produce rods or double-length mouthpiece portions as shown in FIGURE 7c, in which such a rod is shown between two cigarette lengths. The final subdivision is made through the hollow space, to produce two mouthpiece cigarettes. Each mouthpiece contains two components end to end, with a hollow open-ended tube at the extreme end.

As in the arrangement described with reference to FIGURES 5 and 5a to 5c, the stubs S are preferably of a different character from the stubs S', the stubs S (which after subdivision will lie closest to the tobacco portion of the cigarette) being chosen for filtering properties, while the stubs S' (which will mask the stubs S) may be chosen mainly for their appearance.

In the arrangement just described, as the mouthpieces to be produced are to have hollow open ends, the paper web 9 is of stiff paper.

In the example just described with reference to FIGURES 7 to 10a and 7a to 7c, the pitch of the thread 316 must be sufficiently wide to be able to accommodate groups of stubs, each group consisting of one long stub S and two short stubs S'. The short stubs S' are initially fed in pairs, each pair being the equivalent in length (in the particular example illustrated) of one long stub S. On each revolution of the worm, one group of stubs is fed to the paper web 9 by the thread 316. Each such group can be considered the equivalent of two stubs or components, so that four components are fed during every two revolutions of the worm. It will be seen from FIGURE 7a that the continuous composite rod is severed through every second long stub S. Accordingly, considering each pair of short stubs S' as the equivalent of one component, the cut-off operates once for every four components fed to the paper web by the worm. To put the matter in another way, the cut-off operates once for every two revolutions of the worm. Accordingly, the gear ratio of the main drive to the worm is maintained at 1:2 and that of the main drive to the cut-off 1:1.

FIGURE 14 shows a further example of a mouthpiece rod which can be produced by a further arrangement of the machine, which it seems unnecessary to illustrate in detail. It will be seen that in order to produce this rod, three fairly long components must be fed to the paper web for each cutting operation of the cut-off. Accordingly for this purpose the gear ratio of the main drive to the cut-off is made ¾:1, while that of the main drive to the worm remains at 1:2. The speed of the conveyor 8, web 9 and belt 30 is suitably adjusted to accommodate the stubs with the desired spaces between them.

In all the examples mentioned above, the gear ratios of the main drive to the cut-off are ¾:1, 1:1 or 1½:1, while the ratio of the main drive to the worm remains at 1:2. A number of interchangeable worms can be provided as part of the equipment of the machine, all having different arrangements of thread suitable for various different requirements as regards the length or lengths of components to be fed or their arrangement or disposition in the rod moreover the speed of the web 8, conveyor 9 and belt 30 can be readily adjusted (by changing the pulley 8a where necessary, and adjusting its diameter) to whatever speed may be required, in order for the paper web to accommodate various different quantities of components of various lengths, with or without spaces of desired length between some or all of the components. When the machine is equipped with the relatively simple and inexpensive range of change parts for effecting all these adjustments, it is capable of producing a very wide range of composite rods of different composition yet all of a reasonably convenient size for handling and use in the manufacture of mouthpiece cigarettes with many different forms of composite mouthpiece. Thus in addition to the advantages given by the machine, in any particular arrangement, in accurate control and positioning of the mouthpiece components, the machine has the further advantage of extreme versatility in the range of products it can be used to produce.

As stated above, the stub-feeding arrangements by which stubs are fed on to the suction conveyor 3 are each similar to that described in United States patent specification No. 3,009,557. FIGURES 11 and 12 show a slightly modified arrangement for feeding pairs of short stubs for use in the arrangement according to FIGURES 7 to 10. The pushers 23 push the short stubs lengthwise in line along a support surface 35, which has a sloping part 36 up which the leading stub of each successive pair is pushed, as shown in FIGURE 11. A disc 37 has equally spaced fingers 38, which on rotation of the disc are brought in succession into engagement with alternate stubs; each stub so engaged is the stub immediately following a stub which has been pushed up the sloping part 36. This operation, as shown in FIGURE 12, raises the stub out of line with those which follow it, and into line with the preceding stub which has been pushed up the sloping part 36. Thus the two abutted stubs are raised out of line as a pair, and the rear end face of the rear stub of the raised pair is then engaged by a pusher 24 which accelerates the pair of stubs while feeding them on to the suction conveyor.

It will be seen that each of the fingers 38 has a stub-engaging surface of substantial length so as to ensure that the stub is lifted bodily.

A cover plate 39 controls the pairs of stubs after they have been pushed out of line. The stubs are also controlled, while approaching the sloping part 36 and the disc 37, by a cover plate 40, which has a flexible extension 41 which can yield to permit the rear stub of a pair to be lifted by a finger 38, but holds down the stub immediately following the one being raised.

It will be understood that the hopper from which the short stubs are fed will be provided with a suitable number of knives arranged to cut the long stub lengths, during their feed from the hopper, into suitable short lengths. In the example illustrated in FIGURES 11 and 12 (where pairs of short stubs are fed for use in the arrangement described with reference to FIGURES 7 to 10 and 7a to 7c), each long length is cut into eight short lengths in the hopper 2 (FIGURE 1) while in the hopper 1 lengths of the same size are cut into four.

What I claim as my invention and desire to secure by Letters Patent is:

1. A machine for making composite mouthpiece rods, in which a continuous composite rod is formed by feeding components to, and enclosing them in, a continuous wrapper, the said machine comprising means to feed the wrapper continuously, means to feed components in a predetermined sequence to the wrapper, means operative in timed relationship to the component feeding means to cut the rod at intervals such that each severed length of rod contains a desired number of components, and means permitting alteration of the speed of the wrapper for a given rate of operation of the component feeding means to enable the latter to feed said desired number of components in a desired arrangement in the time required to feed a length of the wrapper equal to the total length of said desired number of components, in which said component feeding means includes a rotatable member provided with a screw thread with a leading face serving as a cam surface arranged to engage successive components and push them forwardly onto the wrapper, said member being rotatable about an axis substantially parallel to the direction of feed of said components immediately prior to engagement by said screw thread.

2. A machine as claimed in claim 1, comprising means to change the timed relationship between the rate of operation of the feeding means and that of the cutting means so that the cutting means can sever lengths of the rod containing a different desired number of components.

3. A machine as claimed in claim 2, comprising a common driving means to drive the cutting means and feeding means, one of which is driven through interchangeable gearing whereby the speed ratio of the one to the other may be varied over a given range.

4. A machine as claimed in claim 1, wherein more than one screw thread is provided on the rotatable member, the threads being equally spaced around the circumference of the said rotatable member, whereby more than one component can be fed for each revolution of the rotatable member.

5. A machine as claimed in claim 4, wherein the threads are arranged to have unequal spaces between them so that components of different lengths may be accommodated in adjacent spaces between different threads.

6. A machine as claimed in claim 1, including an endless moving surface opposed to the surface of the said wrapper so that the two said surfaces can grip components between them, the said rotatable member being arranged to push a component into the grip of the said wrapper surface and the said endless surface, and being recessed at its delivery end to accommodate at least a guide member about which the said endless surface passes, so that the said endless surface can extend far enough rearwards (considered in the direction of feed of the components) to be able to engage a component whilst the said component is still being pushed forwards by the said screw thread.

7. A machine as claimed in claim 1, in which the said rotatable member is provided with a presser-surface so located as to engage at least the rear one of two endwise abutted, forwardly moving components and to press the said rear component against a counter-surface so as to arrest or retard its forward movement until the screw thread has entered between the two components so as to ensure their separation.

8. A machine as claimed in claim 7, wherein the said counter-surface is formed by a bridge piece over a conveyor which feeds the components to the rotatable member.

9. A machine as claimed in claim 7, wherein pairs of relatively short, endwise abutted components are fed in alternation with single components, and wherein the pressure-surface engages at least the rear one of each such pair of short components, so that the said rear component is gripped and retarded, thereby enabling the pair to be separated by the screw thread, which feeds the leading one of the separated pair into abutment with the single component which precedes it, and which is itself abutted against the rear one of the preceding pair of short components, whereby groups of components are formed, each consisting of a single component lying between two short components, the groups being spaced apart by the thread on the rotatable member.

References Cited in the file of this patent
UNITED STATES PATENTS

| | | |
|---|---|---|
| 2,109,148 | Gwinn | Feb. 22, 1938 |
| 2,284,286 | Krueger | May 26, 1942 |
| 2,798,495 | Molins | July 9, 1957 |
| 2,953,878 | Schur | Sept. 27, 1960 |
| 2,957,285 | Molins | Oct. 25, 1960 |